US012571777B2

(12) United States Patent
Petricevic

(10) Patent No.: US 12,571,777 B2
(45) Date of Patent: Mar. 10, 2026

(54) METHOD AND DEVICE FOR EVALUATING A STATE OF AN OBJECT, AND COMPUTER PROGRAM

(71) Applicant: iNDTact GmBH, Würzburg (DE)

(72) Inventor: Raino Petricevic, Würzburg (DE)

(73) Assignee: iNDTact GmBH, Würzburg (DE)

( * ) Notice: Subject to any disclaimer, the term of this patent is extended or adjusted under 35 U.S.C. 154(b) by 295 days.

(21) Appl. No.: 18/025,400

(22) PCT Filed: Sep. 9, 2021

(86) PCT No.: PCT/EP2021/074758
§ 371 (c)(1),
(2) Date: Mar. 9, 2023

(87) PCT Pub. No.: WO2022/053540
PCT Pub. Date: Mar. 17, 2022

(65) Prior Publication Data
US 2023/0333067 A1        Oct. 19, 2023

(30) Foreign Application Priority Data

Sep. 9, 2020    (DE) .......................... 102020123548.8

(51) Int. Cl.
*G01N 29/44*        (2006.01)
*G01N 29/46*        (2006.01)

(52) U.S. Cl.
CPC ......... *G01N 29/4427* (2013.01); *G01N 29/46* (2013.01)

(58) Field of Classification Search
None
See application file for complete search history.

(56) References Cited

U.S. PATENT DOCUMENTS 6,425,293 B1      7/2002   Woodroffe et al.
6,498,996 B1 *   12/2002   Vallot .................. G01C 21/188
                                                                          702/56
6,507,790 B1      1/2003   Radomski
                          (Continued)

FOREIGN PATENT DOCUMENTS

CN           104121985  A      10/2014
DE      102018210470  A1       1/2020

*Primary Examiner* — Suman K Nath
(74) *Attorney, Agent, or Firm* — Idea Intellectual Limited; Sam T. Yip

(57)                    ABSTRACT
A method for evaluating a state of an object is provided. The method includes steps as follows. An excitation information describing a mechanical excitation of the object is obtained. A plurality of spectral excitation values are generated as a function of the excitation information by a frequency analysis, in which each of the spectral excitation values is assigned to one spectral section of a plurality of predetermined spectral sections. A plurality of spectral reference excitation values relating to a reference state of the object are obtained, which are associated with a respective one of the spectral sections. Relative excitation values are determined for at least a part of the spectral sections by relating the spectral excitation value, which is associated with the respective spectral section, to the spectral reference excitation value, which is associated with the respective spectral section.

29 Claims, 8 Drawing Sheets

(56) References Cited

U.S. PATENT DOCUMENTS

| 6,529,838 B1 * | 3/2003 | Horiuchi ................. | G01H 3/08 |
| | | | 702/56 |
| 2010/0305886 A1 | 12/2010 | Zhuge | |
| 2011/0062339 A1 | 3/2011 | Ruhge et al. | |

* cited by examiner

METHOD AND DEVICE FOR EVALUATING A STATE OF AN OBJECT, AND COMPUTER PROGRAM

BACKGROUND

1. Field of the Disclosure

The present invention relates to a method for evaluating a state of an object. In addition, the invention relates to a computer program and a device for evaluating a state of an object.

2. Description of the Related Art

DE 10 2018 210 470 A 1 discloses a method for early damage detection of a machine, in which a vibration signal of a machine is detected, a signal is transformed from the time domain to an image domain, a dominant excitation determined according to an operating quantity is reduced in amount, and a signal value is compared with a comparison value.

U.S. Pat. No. 6,425,293 B1 discloses a method in which a vibration is detected and a vibration spectrum is obtained by performing an FFT. The vibration spectrum is divided into N bands and a spectral energy is generated for each band. The spectral energy in a respective band is compared with spectral energy threshold values. For each band, numerical values are assigned to each exceedance of a threshold. The numerical values are summed and compared to additional threshold values.

In conventional state evaluation methods, spectral excitation values are typically determined from excitation information describing a mechanical excitation of the object by means of a frequency analysis. A characteristic value is then determined from these by a function that sums up the spectral excitation values over the frequency. This characteristic value is compared with a reference value which has been determined in essentially the same way from excitation information acquired in a reference state of the object.

SUMMARY

The invention is based on the task of providing an improved possibility for evaluating the state of an object.

According to the invention, this task is solved by a method for evaluating a state of an object, comprising the following steps: Obtaining excitation information describing a mechanical excitation of the object; generating a plurality of spectral excitation values in dependence on the excitation information by means of a frequency analysis, the spectral excitation values each being associated with one spectral section of a plurality of predetermined spectral sections; obtaining a plurality of reference spectral excitation values relating to a reference state of the object and associated with a respective one of the spectral sections; and determining relative excitation values for at least a portion of the spectral sections by relating the spectral excitation value associated with the respective spectral section to the reference spectral excitation value associated with the respective spectral section.

The invention is characterized in particular by the fact that individual spectral excitation values generated by the frequency analysis are related to the spectral reference excitation values corresponding to the spectral sections in order to obtain relative excitation values related to the spectral sections. Compared to a conventional referencing of summed spectral excitation values and summed spectral reference excitation values, a state deviation can thus be determined in relation to the respective spectral section, so that advantageously the entire information content over the spectrum of the spectral excitation values can be used simultaneously.

While in conventional methods the spectral sections must already be selected in such a way that spectral sections relevant for a state deviation are covered when determining the spectral reference excitation values and the spectral excitation values, the method according to the invention can also detect a change in the spectral excitation values in individual spectral sections which is not expected at all. The method according to the invention therefore has the advantage of being universally applicable, even if relevant spectral sections are unknown, so that especially when using broadband sensors that detect the mechanical excitation, their detection potential can be fully exploited.

With particular advantage, the method according to the invention also allows effective detection of deviations in spectral sections of high frequency with a low signal-to-noise ratio (SNR), since the relative excitation values for these high spectral sections contain the deviation independently of deviations in lower—and thus more dominant—spectral sections.

The method according to the invention can be used in a very flexible manner. The state can be, for example, a wear state, a lack of lubrication, a contamination, a fatigue, a defect, an operating state, an intactness, a health state, a quality, a utilization, a power input, a filling level, a hardness or a fluid delivery quantity. A variety of use cases are also conceivable with respect to the object: For example, the object may be a machine, a plant, a machine element, in particular a gear, a bearing, a pump, a motor or a robot, a manufacturing tool, a land vehicle, a water vehicle, an air vehicle or a space vehicle or a part thereof, a structure, a component or a building or a part thereof. It is also possible for the object to be a body part of a living being, in particular an animal or a human being.

The operating state can be a stationary operating state or a non-stationary operating state, in particular with an arbitrary or characteristic course. The machine may be an injection molding machine. The bearing may be a pivot bearing, for example in a crane or a wind turbine. In a wind turbine, the pivot bearing may be a pitch bearing. The object may further be an actuator or a retraction and extension mechanism, in particular of a solar panel array of a satellite, a landing gear of an aircraft or a switch actuator of a railroad track.

It is preferred in the method according to the invention, if the spectral excitation values and the reference excitation values describe an amplitude, a phase, a power or a power spectral density (PSD). Alternatively or additionally, it can be provided in the method according to the invention that the spectral excitation values and the reference excitation values describe an effective value, a magnitude maximum value or an amplitude distribution density or a value derived therefrom, in particular a crest factor or a kurtosis factor.

It is preferred in the method according to the invention if in the step of generating the plurality of spectral excitation values the spectral excitation values are stored in a predetermined data structure, in particular a matrix, a vector, a list or a data array. It may further be provided that the plurality of spectral reference excitation values is provided in a predetermined data structure, in particular a matrix, a vector, a list or a data array. It may further be provided that in the step of determining the plurality of relative excitation values, the relative excitation values are stored in a predetermined data structure, in particular a matrix, a vector, a list or a data field. A "data structure" in the aforementioned sense can also be generally understood as a list of numbers.

Furthermore, the spectral excitation values can be generated for one time interval or averaged over several time intervals. Thus, the spectral excitation values can be generated over a "time window".

Alternatively or additionally, the spectral reference excitation values can be generated for one time interval or averaged over several time intervals.

Accordingly, the spectral reference excitation values can also be generated windowed.

Averaging the spectral excitation values and/or the spectral reference excitation values over several time intervals in succession is particularly advantageous for repetitive operating states with short quasi-stationary time intervals in order to improve the SNR.

Expediently, the spectral sections can be disjoint and/or defined over the frequency range. Alternatively or additionally, the spectral sections can be of equal or different size, in particular logarithmically divided. The spectral sections may be contiguous or separated. Preferably, the spectral excitation values are determined over a predetermined frequency band comprising the spectral sections.

The relative excitation values can be determined for all spectral sections. However, it is also possible that individual spectral sections or an interval of spectral sections are selected manually and/or automatically by a user.

Preferably, the relative excitation values have a continuous, in particular real, range of values. This allows even minor deviations from the reference excitation values to be resolved.

With regard to the frequency analysis, the method according to the invention typically provides that it is performed by means of a Fourier analysis, in particular by means of a continuous Fourier transform, a discrete Fourier transform, a fast Fourier transform or a Fourier transform for discrete-time signals, or by means of a determination of a power spectral density.

The method can be performed with good results especially at relatively coarse frequency resolutions. Thus it can be provided that the frequency analysis has a frequency resolution of at least 1 Hz, further preferably at least 10 Hz, further preferably at least 100 Hz, particularly preferably at least 1 kHz. Advantageously, this allows a considerable reduction of the data volume.

Nevertheless, the method can also be performed with relatively fine frequency resolutions. Thus, it can be provided that the frequency analysis has a frequency resolution of at most 1 Hz, preferably at most $10^{-1}$ Hz, further preferably at most $10^{-2}$ Hz, further preferably at most $10^{-3}$ Hz, especially preferably at most $10^{-4}$ Hz.

Typically, in the step of determining the relative excitation values, the respective spectral excitation values and the associated spectral reference excitation values are related by dividing.

With particular advantage, the method according to the invention may also comprise the following step: Determining a state evaluation quantity by a state evaluation function which links as parameters the relative excitation values and/or values derived from the relative excitation values. When determining such a state evaluation quantity, it is avoided in particular that spectral section-specific deviations of the spectral excitation value from the spectral reference excitation value are compensated by prior summation and thus "smear". The state evaluation function can be generally denoted by $Q(x_i)$ where $Q$ is the state evaluation parameter, $x_i$ the parameters and $1 \leq i \leq n$ the n spectral sections. The state evaluation quantity has conveniently scalar values.

In this case, it is possible that the relative excitation values are directly linked as parameters of the state evaluation function. In this case $x_i = q_i(p_i, p_i^0)$, where $q_i(p_i, p_i^0)$ denotes the relative excitation values obtained by relating the spectral excitation values $p_i$ and the spectral reference excitation values $p_i^0$ are determined. If the in-reference is done by division, the following can be obtained $$q_i = \frac{p_i}{p_i^0}$$

With particular advantage, however, it is provided that a parameter value determined from an inverted relative excitation value is used as the respective parameter when the spectral excitation value is smaller than the spectral reference excitation value, and the relative excitation value is used when the spectral excitation value is larger than the spectral reference excitation value. Alternatively, a parameter value determined from an inverted relative excitation value can be used as the respective parameter when the spectral excitation value is larger than the reference spectral excitation value, and the relative excitation value can be used when the spectral excitation value is smaller than the reference spectral excitation value. Thus, deviations of the spectral excitation value from the reference spectral excitation value in either direction, i.e., both a decrease in the spectral excitation value and an increase in the spectral excitation value, can affect the state evaluation quantity in the same way. In conventional methods, which only sum up the spectral excitation values, deviations upwards and downwards in different spectral sections balance each other out, which can considerably reduce the significance of the state evaluation quantity.

In terms of the formula, the following can apply:

$$x_i = q_i(p_i, p_i^0)^{sign(p_i - p_i^0)} \text{ or } x_i = q_i(p_i, p_i^0)^{sign(p_i^0 - p_i)}$$

where sign(•) denotes the signum function and in all other respects the aforementioned designations apply. For the case of in-reference by division then applies in particular:

$$x_i = \left(\frac{p_i}{p_i^0}\right)^{sign(p_i - p_i^0)}$$

respectively $$x_i = \left(\frac{p_i}{p_i^0}\right)^{sign(p_i^0 - p_i)}$$

There are a number of possibilities for the concrete design of the state evaluation function: The state evaluation function can comprise a summation, the formation of an arithmetic mean value, the formation of an effective value or the formation of a zero crossing rate. The zero crossing rate is a number of zero crossings, in particular of the phase. Alternatively or additionally, the state evaluation function may comprise a weighting of the parameters, in particular by means of rational, real or complex weighting factors having an irrational component and/or by means of linear or exponential weighting factors and/or frequency-dependent weighting factors.

If the state evaluation function includes the formation of an arithmetic mean, it can be expressed by the following formula:

$$Q(x_i) = \frac{1}{n}\sum_{i=1}^{n} x_i$$

If the state evaluation function includes the formation of an arithmetic mean and a weighting, it can be expressed by the following formula:

$$Q(x_i) = \frac{1}{n}\sum_{i=1}^{n} a_i \cdot x_i$$

If the state evaluation function includes the formation of an effective value, it can be expressed by the following formula:

$$Q(x_i) = \sqrt{\frac{1}{n}\sum_{i=1}^{n} x_i^2}$$

If the state evaluation function includes the formation of an RMS value and a weighting, it can be expressed by the following formula:

$$Q(x_i) = \sqrt{\frac{1}{n}\sum_{i=1}^{n} a_i \cdot x_i^2}$$

Here denotes $a_i$ is a weighting factor, where $a_i \in \mathbb{Q}$ or $a_i \in \mathbb{R}$ or $a_i \in \mathbb{C}$, where $\mathbb{Q}$ is the set of rational numbers, $\mathbb{R}$ is the set of real numbers or $\mathbb{C}$ denote the set of complex numbers. For the rational and real weighting factors, the following applies in particular $0 \le a_i \le 1$. For linear weighting factors applies in particular $a_i = m \cdot i + c$, where m and c are constants. For exponential weighting factors, the following applies in particular $$a_i = e^{-\frac{b \cdot i}{n}}$$

where b is a constant.

If the state estimation function includes the formation of a zero crossing rate, this can be expressed by the following formula:

$$Q(x_i) = \frac{1}{n-1}\sum_{i=1}^{n-1} \chi_n(x_i \cdot x_{i-1})$$

Here denotes $\chi_n(\bullet)$ an indicator function, for example:

$$\chi_n(x_i x_{i-1}) = \begin{cases} 1, & \text{if } x_i x_{i-1} \ge 0 \\ 0, & \text{if } x_i x_{i-1} < 0 \end{cases}$$

6

The method according to the invention may further comprise the following step: Providing the spectral excitation values and/or the relative excitation values at a radio and/or hardware interface. This allows spectral excitation values and/or the relative excitation values to be provided for external processing.

It is further possible that the method according to the invention further comprises the following step: Displaying the state evaluation quantity and/or a time history of the state evaluation quantity on a display unit. Thus, the current state evaluation quantity may be conveniently displayed to a user. Alternatively or additionally, the following step may be provided: Providing the state evaluation quantity at a radio and/or hardware interface.

This allows the state evaluation quantity to be made available for external processing.

In a preferred embodiment of the method according to the invention, it further comprises the following steps: Performing a comparison of the state evaluation quantity or a change over time of the state evaluation quantity with one or more predetermined or adjustable threshold values. Preferably, the following step is then further provided: Outputting an acoustically and/or visually and/or haptically perceptible signal as a function of a result of the comparison. In this way, a user can be directly alerted to relevant changes in the state evaluation quantity. The threshold value or one of the threshold values may, for example, be a prewarning threshold. This may, for example, alert the user that an advanced level of wear has been reached. The threshold value or one of the threshold values can be an alarm threshold, for example. This can, for example, alert the user that wear-related damage is to be expected immediately or has already occurred. Provided that a temporal change of the state evaluation quantity is considered, a trend display or trend indication of the state can thus be made possible.

In general, the method may further comprise the following step: Detecting the mechanical excitation and providing the excitation information. The detection can be performed by means of at least one sensor, in particular a vibration sensor and/or a sound sensor and/or a structure-borne sound sensor and/or an acceleration sensor and/or an optical sensor.

It is possible that a detection area of the at least one sensor is homogeneous. Alternatively, a sensing region of the at least one sensor may exhibit resonance at a predetermined frequency or frequencies. If signals in a range around the resonance are excited by a change in state, a resonant sensor responds earlier than a senor that is homogeneous over its bandwidth. As a result, a change of state that lies in the range of the resonance can be detected correspondingly earlier.

Preferably, it is provided that the at least one sensor is tuned or is tunable with respect to the predetermined frequency or frequencies, in particular to a frequency at which a change in the state of the object is to be expected. Then the or a respective resonance can be selected accordingly depending on the object to be monitored.

The method according to the invention may further comprise the following step, by which in particular the excitation information is obtained: Detecting the mechanical excitation, in particular by means of a vibration sensor and/or a sound sensor and/or a structure-borne sound sensor and/or an acceleration sensor and/or an optical sensor, and providing the excitation information.

The method according to the invention may further comprise the following steps preceding the step of obtaining the excitation information, in particular also the step of detecting the mechanical excitation: Determining the reference spectral excitation values corresponding to the spectral excitation values when the object is in the reference state prior to the step of detecting the mechanical quantity; and storing the determined reference spectral excitation values. Thus, the reference spectral excitation values can be determined as part of the method itself. Alternatively, it is also possible that spectral reference excitation values generated at least partially virtually or synthetically are used within the scope of the method according to the invention.

Preferably, at least the generation of the spectral excitation values, in particular also the determination of the relative excitation values and/or the determination of the state evaluation quantity, is performed repeatedly, in particular periodically. The repetition can be time-controlled or triggered by a trigger signal.

Typically, the spectral excitation values are generated over a time window of several minutes.

Preferably, the spectral excitation values are generated during each repetition in the same stationary or quasi-stationary operating state, for example at a constant rotational speed, of the object. It is also possible that the spectral excitation values are generated during the repetition at several different stationary or quasi-stationary operating states of the object. In this case, the reference spectral excitation values for each repetition may refer to a different reference state. In particular, the quasi-stationary operating states can be used to detect a non-stationary operating state composed thereof. In particular, non-stationary states with a characteristic course can be additionally evaluated with regard to a change of their characteristic. The stationary or quasi-stationary operating state corresponds in particular to that at which the reference excitation values were generated.

It is also possible for the time window to extend at least a tenth of a second and/or at most 10 seconds, especially for non-stationary operating states with only short, repeating quasi-stationary time windows. In this case, averaging can be done over several time windows with the repeating quasi-stationary operating state in sequence. This can be done until an acceptable SNR is obtained.

Within the scope of the method according to the invention, further an environmental information describing at least one environmental parameter of the object can be used. The at least one environmental parameter may be a temperature and/or a humidity and/or a displacement and/or a force and/or an elongation and/or a velocity and/or an acceleration and/or an SPS process section and/or a flow and/or a position, in particular an angular or switching position, and/or an illuminance and/or a position and/or an inclination and/or a magnetic field and/or a rotational speed and/or a pressure.

For this purpose, the environmental information can be provided by an environment sensor. The environment sensor can have a temperature sensor and/or a humidity sensor and/or a position sensor and/or an inclination sensor and/or a gyroscope and/or a magnetic field sensor and/or a speed sensor and/or a displacement sensor and/or a force sensor and/or a strain sensor and/or a speed sensor and/or an acceleration sensor and/or a position sensor and/or a light sensor and/or a flow sensor and/or a pressure sensor. Thus, in addition to the, in particular mechanical, excitation information, other information relevant to the state of the object can also be acquired from the environment or surroundings.

Alternatively or additionally, the environmental information can be obtained as a control signal, in particular analog or digital. Preferably, the environmental information is received from a programmable logic controller (PLC).

It can be provided that the environmental information is used as a trigger signal. This can trigger the determination of the spectral excitation values and/or the relative excitation values and/or the state evaluation quantity depending on the environmental information.

In this case, the excitation information and/or the state evaluation quantity can be correlated with the environmental information.

Furthermore, it is preferred that the excitation information and/or the spectral excitation values and/or the spectral reference excitation values are corrected on the basis of the environmental information. This can be done on the basis of stored data about a dependence of this information or values on the environmental information. The dependence can be stored in the form of a function or a formula. Preferably, the relative excitation values are determined as a function of the corrected spectral excitation values and/or the corrected spectral reference excitation values, in particular therefrom.

It is further possible that the state evaluation quantity is corrected based on the environmental information. In this case, uncorrected or only partially corrected state evaluation quantities can be provided together with environmental information and the correlations or initial or additional corrections of the state evaluation quantity with respect to the environmental information can be performed off-device (e.g. on a user interface).

Thus, the spectral reference excitation values and/or the spectral excitation values and/or the temperature-dependent state evaluation quantity can be corrected via a stored temperature dependence function using the environmental information describing the temperature before the temperature-independent state evaluation quantity is determined. Thus, a temperature correction of the state evaluation quantity can be achieved.

Accordingly, even if the speed is dependent, for example, a correction of the spectral excitation values and/or the reference excitation values and/or the speed-dependent state evaluation quantity can be corrected with the aid of the environmental information describing the speed before the speed-independent state evaluation quantity is determined. In this way, a speed correction of the state evaluation quantity can be achieved.

In the same way, if the process pressure is dependent, for example, a correction of the spectral excitation values and/or the reference excitation values and/or the process pressure-dependent state evaluation quantity can be corrected with the aid of the environmental information describing the process pressure before the process pressure-independent state evaluation quantity is determined. In this way, a process pressure correction of the state evaluation quantity can be achieved, e.g. for a pump or an injection molding process.

The problem underlying the invention is further solved by a computer program comprising instructions which, when the program is executed by a computer, cause the computer to carry out the steps of the method according to the invention.

The task underlying the invention is further solved by a device for evaluating a state of an object, in particular arranged for carrying out the method according to the invention, comprising: a data interface adapted to obtain excitation information describing a mechanical excitation of the object; and a signal analysis unit comprising an analysis section arranged to generate a plurality of spectral excitation values in dependence on the excitation information by means of a frequency analysis, the spectral excitation values each being assigned to one spectral section of a plurality of predetermined spectral sections, a data interface arranged to obtain a plurality of spectral reference excitation values, the spectral reference excitation values being related to a reference state of the object, a data interface adapted to obtain a plurality of reference spectral excitation values relating to a reference state of the object and associated with a respective one of the spectral sections, a determination section adapted to determine relative excitation values for at least a part of the spectral sections by relating the spectral excitation value associated with the respective spectral section to the reference spectral excitation value associated with the respective spectral section.

In the device according to the invention, the signal analysis unit may further comprise a further determination section, which is arranged to determine a state evaluation quantity by a state evaluation function using the relative excitation values and/or parameter values derived therefrom as parameters.

Advantageously, the device according to the invention may further comprise a radio and/or hardware interface arranged to provide the spectral excitation values and/or the relative excitation values and/or the state evaluation quantity. Alternatively or additionally, the device according to the invention may further comprise a display unit arranged to display the state evaluation quantity and/or a time history of the state evaluation quantity. Preferably, the device according to the invention further comprises: a comparison unit, which is set up to perform a comparison of the state evaluation quantity or a change over time of the state evaluation quantity with one or more predetermined or adjustable threshold values; and an output unit, which is set up to output an acoustically and/or visually and/or haptically perceptible signal as a function of a result of the comparison.

The device according to the invention may further comprise an input and/or an interface for an external trigger signal. Alternatively or additionally, the device according to the invention may further comprise an environment sensor arranged to provide environment information describing an environment parameter of the object. Alternatively or additionally, the device according to the invention may comprise an interface via which the environmental information is obtainable.

It is also preferred if the device according to the invention further comprises an acquisition unit which is set up to acquire analog measurement signals of the mechanical excitation and to provide the excitation information for the data interface, wherein the acquisition unit for acquiring the analog measurement signals comprises in particular a vibration sensor and/or a sound sensor and/or a structure-borne sound sensor and/or an acceleration sensor and/or an optical sensor.

The mechanical excitation can occur during the operation of the object itself and/or be artificially introduced into the object.

According to a preferred embodiment, the acquisition unit is set up to convert the analog measurement signals into digital measurement signals. Alternatively, it is provided that the acquisition unit further comprises a signal processing section, which is set up for filtering and/or for, in particular adjustable, analog signal conditioning of the analog measurement signals, the acquisition unit being set up for converting the filtered and/or conditioned measurement signals into digital measurement signals.

The acquisition unit is conveniently set up to provide the digital measurement signals as excitation information at the data interface. Preferably, the acquisition unit has an analog-to-digital converter for this purpose.

In a preferred embodiment of the device according to the invention, the analysis section is further arranged to provide output data of the frequency analysis as spectral excitation values. Alternatively, it can be provided that the analysis section further comprises a signal processing subsection which is set up, on the one hand, for filtering and/or for, in particular adjustable, digital signal conditioning of the output data of the frequency analysis and, on the other hand, for providing the filtered and/or conditioned output data of the frequency analysis as spectral excitation values.

The device according to the invention may further comprise its own power supply. Preferably, the device according to the invention is arranged to operate autonomously, in particular to realize an integral evaluation.

All the explanations, including the advantages described, concerning the process according to the invention can be applied analogously to the apparatus according to the invention and vice versa.

BRIEF DESCRIPTION OF THE DRAWINGS

Further advantages and details of the present invention will be apparent from the embodiments described below and from the drawings. These are schematic representations and show.

DETAILED DESCRIPTION

Figure 1:
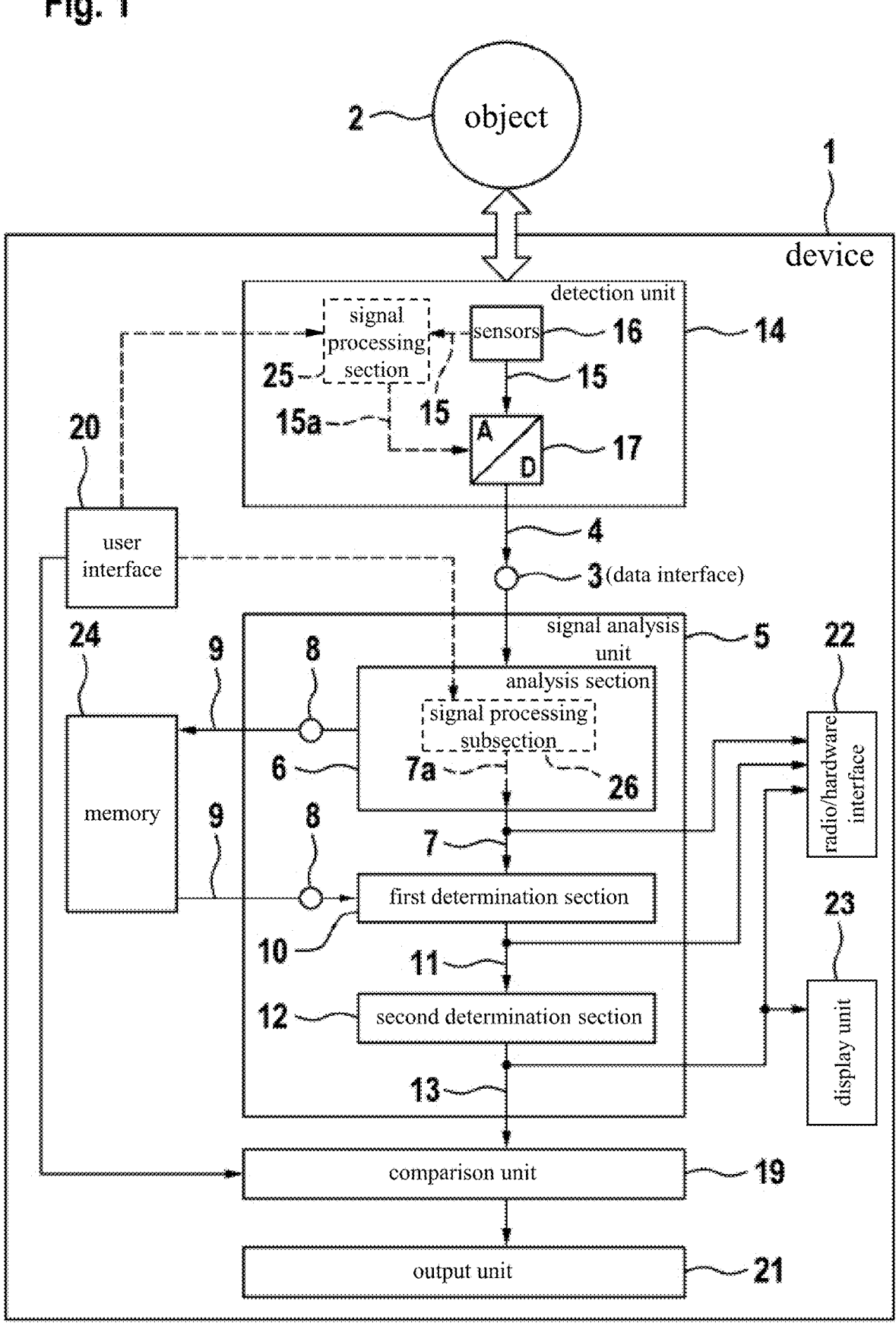
FIG. 1 a block diagram of an embodiment of the device according to the invention.

FIG. 1 is a block diagram of a device 1 for evaluating a state of an object 2.

The device 1 comprises a data interface 3, which is arranged to obtain an excitation information 4 describing a mechanical excitation of the object 2. In addition, the device 1 comprises a signal analysis unit 5.

The signal analysis unit 5 comprises an analysis section 6 which is arranged to generate a plurality of spectral excitation values 7 in dependence on the excitation information 4 by means of a frequency analysis. The spectral excitation values 7 are each assigned to one spectral section of a plurality of predetermined spectral sections. Further, the signal analysis unit 5 comprises a data interface 8 arranged to obtain a plurality of reference spectral excitation values 9 relating to a reference state of the object 2 and associated with a respective one of the spectral sections. A first determination section 10 of the signal analysis unit 5 is arranged for determining relative excitation values 11 for a respective or an adjustable part of the spectral sections. The determination is performed by relating the spectral excitation value 7 associated with the respective spectral section to the spectral reference excitation value 9 associated with the respective spectral section. In addition, the signal analysis unit 5 comprises a second determination section 12 which is arranged for determining a state evaluation quantity 13 by a state evaluation function which uses the relative excitation values as parameters $x_i$ the relative excitation values as parameters $Q(x_i)$ using the relative excitation values as parameters.

The device 1 further comprises an detection unit 14, which is arranged to acquire analog measurement signals 15 of the mechanical excitation of the object 2 and to provide the excitation information 4 for the data interface 3. For this purpose, the detection unit 14 may comprise one or more sensors 16 from the following group: a vibration sensor, a sound sensor, a structure-borne sound sensor, an acceleration sensor and an optical sensor. The detection unit 14 further comprises an analog-to-digital converter 17, which is arranged to convert the analog measurement signals 15 into digital measurement signals provided as the excitation information 4.

The device 1 further comprises a comparison unit 19, which is set up to perform a comparison of the state evaluation quantity 13 or a change over time of the state evaluation quantity 13 with predetermined threshold values or threshold values that can be set by means of a user interface 20 of the device 1. Furthermore, the device 1 has an output unit 21 which is set up to output an acoustically and/or visually and/or haptically perceptible signal as a function of a result of the comparison.

In addition, the device 1 further provides one or more radio and/or hardware interfaces 22 that is/are set up to provide the spectral excitation values 7, the relative excitation values 11, and the state evaluation quantity 13. Thus, this information can be further processed externally. Furthermore, the device 1 additionally has a display unit 23, for example a monitor or a display, which is set up to display the state evaluation quantity 13 or its temporal progression.

The output unit 21 and/or the display unit 23 can also be parameterized by means of the user interface 20.

The spectral reference excitation values 9 are also determined by means of the analysis section 6 when the object 2 is in the reference state. The analysis section is arranged to store the spectral reference excitation values 9 in a memory 24 of the device 1 via the data interface 8. From the memory 24, the spectral reference excitation values 9 can be retrieved by the first determination section 10 via the data interface 8.

According to a further embodiment example, which otherwise corresponds to that described above, the detection unit 14 further comprises a signal processing section 25 which is set up for filtering and for analog signal conditioning of the analog measurement signals 15. For this purpose, the analog signal conditioning may be adjustable by means of the user interface 20. In this embodiment, the detection unit 14 is arranged to convert the filtered and conditioned measurement signals 15a into digital measurement signals provided as the excitation information by means of the analog-to-digital converter 17.

According to a further embodiment, which otherwise corresponds to one of those described above, the analysis section 6 comprises a signal processing subsection 26 which is set up, on the one hand, for filtering and for digital signal conditioning of the output data of the frequency analysis and, on the other hand, for providing the filtered and conditioned output data 7a of the frequency analysis as spectral excitation values 7. For this purpose, the digital signal conditioning can be adjustable by means of the user interface 20.

Figure 2:
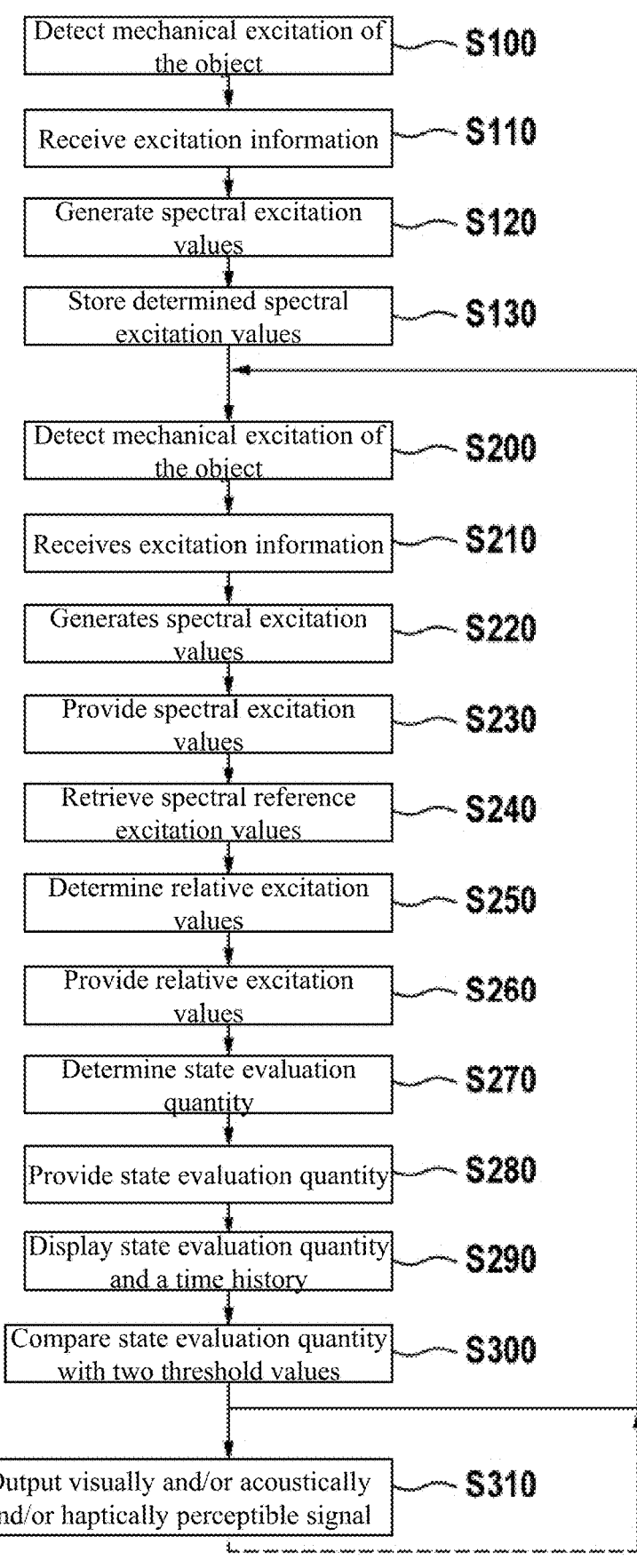
FIG. 2 a flow diagram of an embodiment of the method according to the invention.

The operation of the device 1 is described in more detail below on the basis of embodiments of a method for evaluating the state of the object 2, which the device 1 is set up to perform:

FIG. 2 is a flowchart of embodiments of the method.

Figure 3:
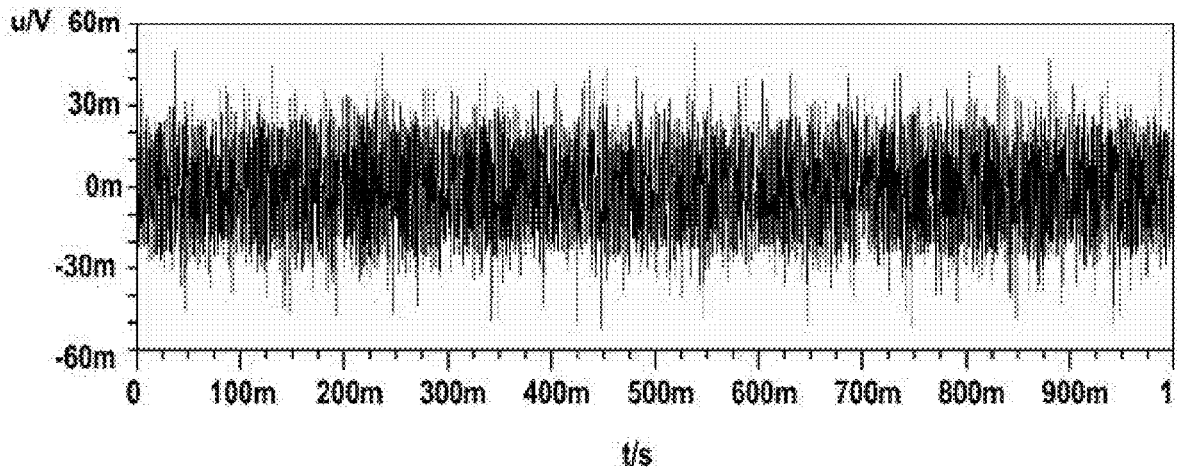
FIG. 3 signal waveforms of an excitation information without damage, at low damage and at advanced damage of the object.
Figure 3:
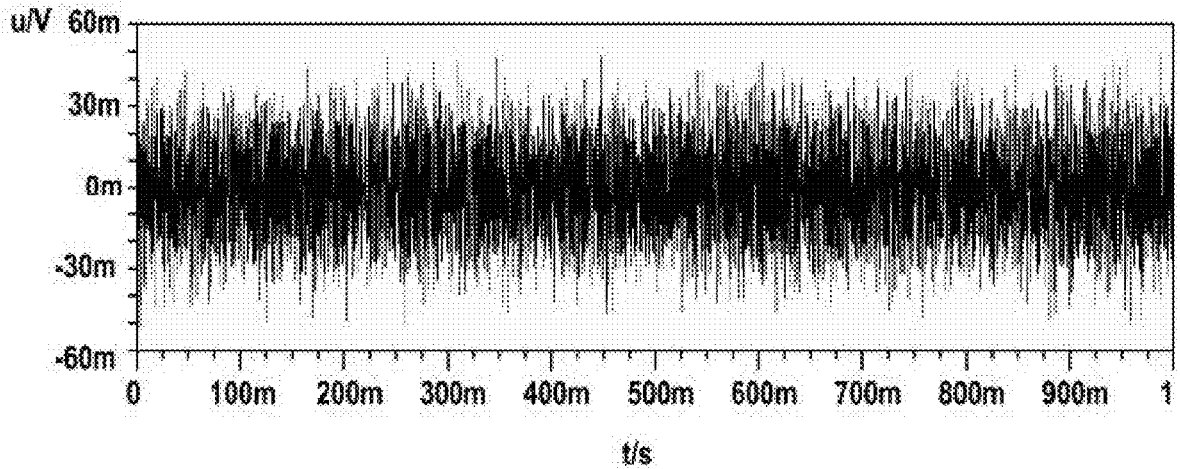
Figure 3:
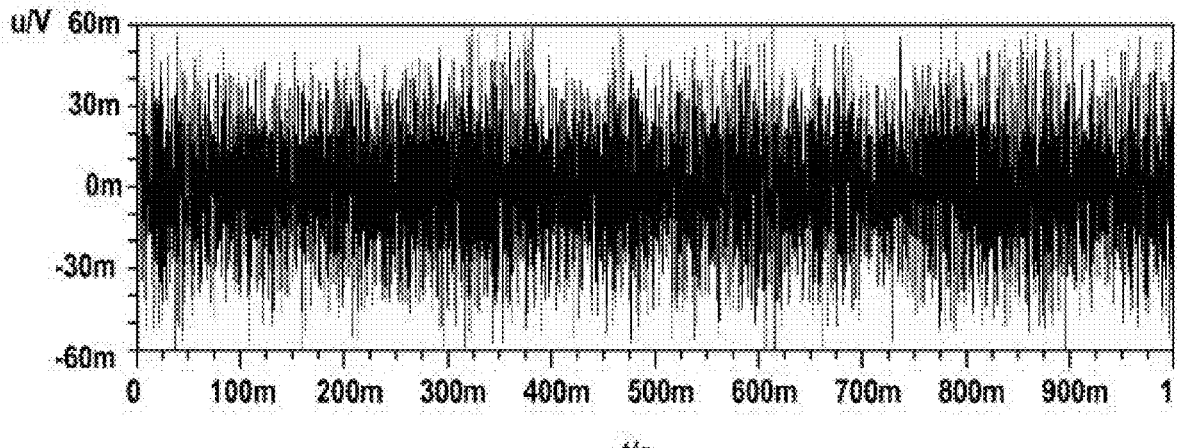

While the object 2 is in the reference state, a step S100 of detecting the mechanical excitation of the object 2 by means of the sensor or sensors 16 of the detection unit 14 is performed. If the signal processing section 25 is provided in the device 1, a step S100 of filtering and analog signal conditioning, in particular depending on a setting obtained via the user interface 20, of the acquired analog measurement signals 15 is further performed. Furthermore, in step S100, the analog measurement signals 15 or the filtered and conditioned measurement signals 15a are converted by means of the analog-to-digital converter 17 into the digital measurement signals, which are provided to the data interface 3 as excitation information 4. FIG. 3 shows the analog measurement signals 15, in this case the amplitude of a voltage u in volts, over the time tin seconds, the upper diagram showing the analog measurement signals 15 in the reference state.

In a subsequent step S110, the analysis section 6 of the signal analysis unit 5 receives the excitation information 4.

Figure 4:
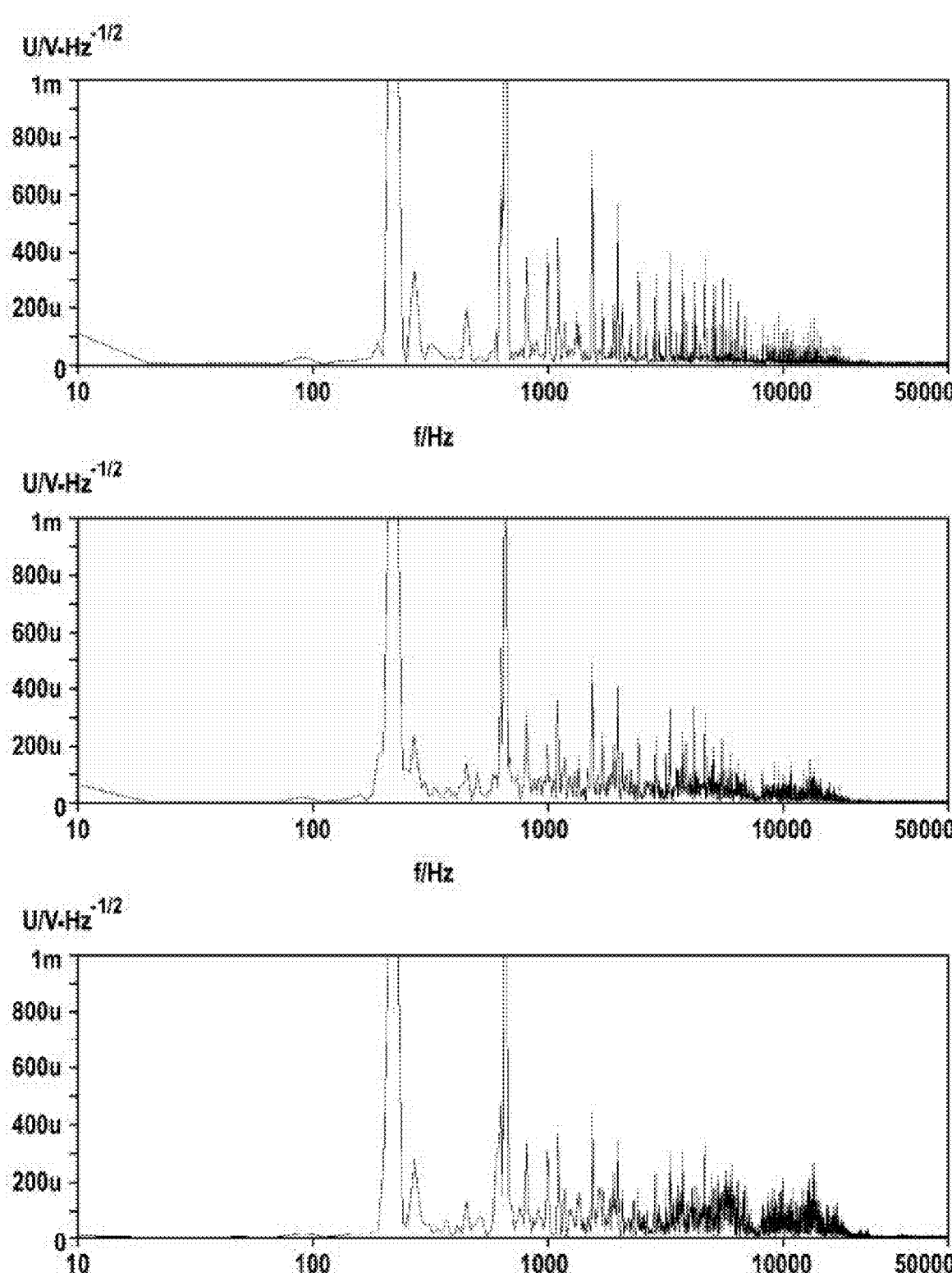
FIG. 4 signal characteristics of spectral excitation values at the damage levels shown in FIG. 3.

In a subsequent step S120, the analysis section 6 generates a plurality of spectral excitation values 7 in dependence on the excitation information 4 by means of a frequency analysis, the spectral excitation values 7 each being associated with a spectral section. If the signal processing subsection 26 is provided in the device 1, in the step S120, filtering and digital signal conditioning, in particular depending on a setting obtained via the user interface 20, of the output data of the frequency analysis are further performed. The output data of the frequency analysis or the filtered and conditioned output data of the frequency analysis 7a are then provided as spectral excitation values 7. FIG. 4 shows spectral excitation values 7, here in the form of amplitude U in $V \cdot Hz^{-1/2}$, versus frequency fin Hz, with the upper diagram representing the reference condition.

In a subsequent step S130, the determined spectral excitation values in the reference state are stored in memory 24 as spectral reference excitation values 9 via data interface 8.

The following steps of the procedure are carried out at a later time when the object 2 is no longer in the reference state. The object 2 continuously experiences a deviation of its state from the reference state. If, for example, a bearing is taken as the object 2 as an example, damage to the bearing can be monitored as the state.

In a step S200, the mechanical excitation of the object 2 is detected by means of the sensor or sensors 16 of the detection unit 14. If the signal processing section 25 is provided in the device 1, in the step S200, filtering and analog signal conditioning, in particular depending on a setting obtained via the user interface 20, of the acquired analog measurement signals 15 are further performed. Furthermore, in step S200, the analog measurement signals 15 or the filtered and conditioned measurement signals 15a are converted by means of the analog-to-digital converter 17 into the digital measurement signals, which are provided to the data interface 3 as excitation information 4. FIG. 3 shows in the middle diagram the analog measurement signals 15 at low damage and in the lower diagram the analog measurement signals 15 at advanced damage.

In a subsequent step S210, the analysis section 6 of the signal analysis unit 5 receives the excitation information 4.

In a subsequent step S220, the analysis section 6 generates a plurality of spectral excitation values 7 depending on the excitation information 4 by means of the frequency analysis, the spectral excitation values 7 each being associated with a spectral section. If the signal processing subsection 26 is provided in the device 1, a filtering and a digital signal conditioning, in particular depending on a setting obtained via the user interface 20, of the output data of the frequency analysis are further performed in the step S220. The output data of the frequency analysis or the filtered and conditioned output data of the frequency analysis 7a are then provided as spectral excitation values 7. For this purpose, FIG. 4 shows in the middle and lower diagrams the spectral excitation values 7 at low and advanced damage, respectively. The frequency analysis can be performed with a rather coarse frequency resolution of, for example, at least 100 Hertz or even 1 kHz, which considerably reduces the data volume during the process.

The determination of the spectral excitation values 7 in steps S200 to S220 can, for example, take place during a time window of at least one minute and/or at most ten minutes.

In a step S230, the spectral excitation values 7 are provided at the or a radio and/or hardware interface 22.

In a subsequent step S240, the spectral reference excitation values 9 previously determined in steps S100 to S130 are retrieved from memory 24 via data interface 8.

In a subsequent step S250, relative excitation values 11 are determined for a respective one of the spectral sections by relating the spectral excitation value 7 assigned to the respective spectral section to the spectral reference excitation value 9 assigned to the respective spectral section by means of the first determination section 10. The correlation is performed by dividing the spectral excitation values 7 by the spectral reference excitation values 9. Expressed as a formula, the following applies:

$$q_i = \frac{p_i}{p_i^0}$$

Figure 5:
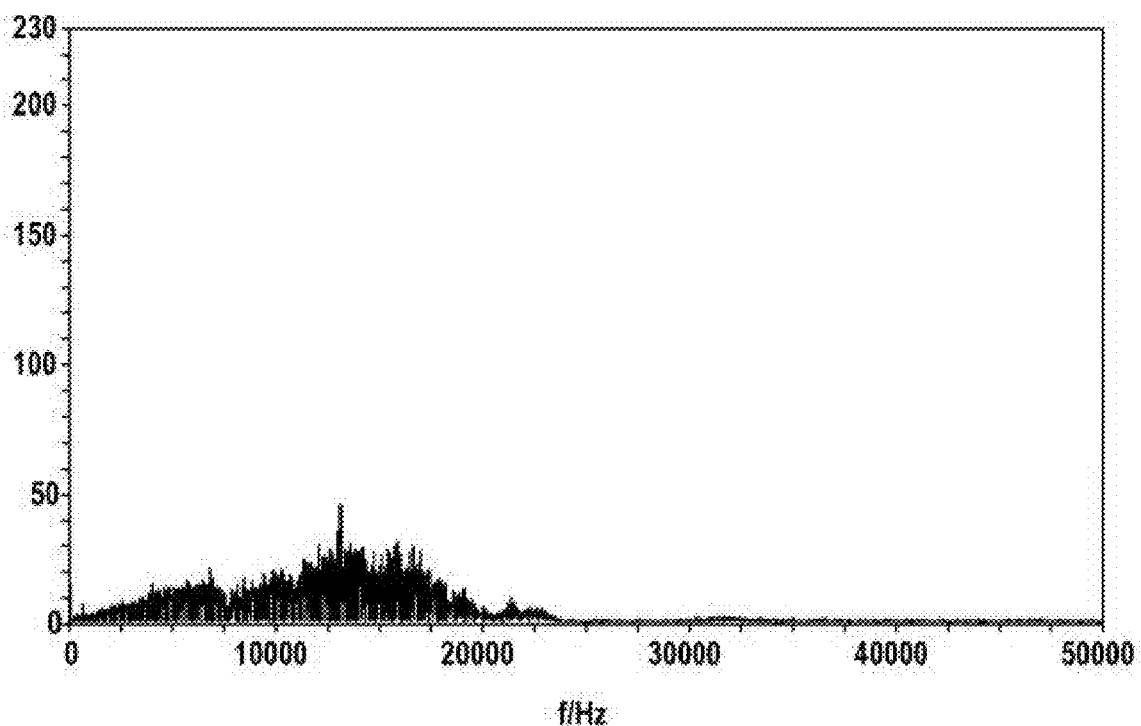
FIG. 5 signal curves of relative excitation values at the damage levels shown in FIG. 3.
Figure 5:
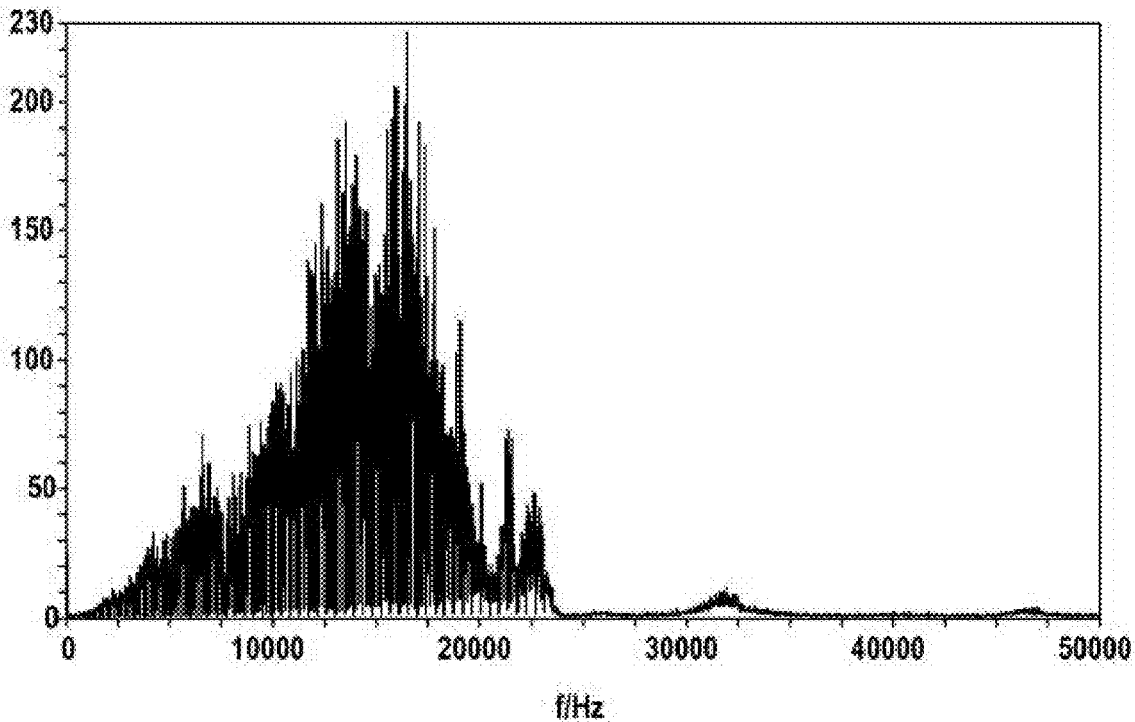

Here $q_i$ denotes the relative excitation values 11, $p_i$ the spectral excitation values 7 and $p_i^0$ the spectral reference excitation values 9 for a respective spectral section $1 \le i \le n$. For this purpose, FIG. 5 shows the relative excitation values 11 in the upper diagram for the low damage and in the lower diagram for the advanced damage, each over the frequency f.

In a subsequent step S260, the relative excitation values 11 are provided to the or a radio and/or hardware interface 22.

In a subsequent step S270, a state evaluation quantity 13 is determined by a state evaluation function $Q(x_i)$ by means of the second determination section 12. For this purpose, the second determination section 12 either directly links the relative excitation values 11 as parameters $x_i$, so that $x_i = q_i$. According to an alternative embodiment of the method, the second determination section 12 links derived values from the relative excitation values 11 as parameters. A respective derived value may be a parameter value determined from an inverted relative excitation value when the relative excitation value is greater than one, and the relative excitation value may be used when the relative excitation value is less than one:

$$x_i = q_i\left(p_i,\ p_i^0\right)^{sign\left(p_i - p_i^0\right)} = \left(\frac{p_i}{p_i^0}\right)^{sign\left(p_i - p_i^0\right)}$$

Alternatively, a respective derived value may be a parameter value determined from an inverted relative excitation value when the relative excitation value is less than one, and the relative excitation value may be used when the relative excitation value is greater than one:

$$x_i = q_i\left(p_i,\ p_i^0\right)^{sign\left(p_i^0 - p_i\right)} = \left(\frac{p_i}{p_i^0}\right)^{sign\left(p_i^0 - p_i\right)}$$

Example state estimation functions are:
an arithmetic mean $$Q(x_i) = \frac{1}{n}\sum_{i=1}^{n} x_i$$

a weighted arithmetic mean:

$$Q(x_i) = \frac{1}{n}\sum_{i=1}^{n} a_i \cdot x_i$$

an effective value:

$$Q(x_i) = \sqrt{\frac{1}{n}\sum_{i=1}^{n} x_i^2}$$

a weighted rms value:

$$Q(x_i) = \sqrt{\frac{1}{n}\sum_{i=1}^{n} a_i \cdot x_i^2}$$

a zero crossing rate:

$$Q(x_i) = \frac{1}{n-1}\sum_{i=1}^{n-1} \chi_n(x_i \cdot x_{i-1})$$

Here $a_i$ denotes a weighting factor, where $a_i \in \mathbb{Q}$ or $a_i \in \mathbb{R}$ or $a_i \in \mathbb{C}$, where $\mathbb{Q}$ is the set of rational numbers, $\mathbb{R}$ the set of real numbers or $\mathbb{C}$ denote the set of complex numbers. For the rational and real weighting factors in particular $0 \le a_i \le 1$ applies. For linear weighting factors in particular $a_i = m \cdot i + c$ applies, where m and c are constants. For exponential weighting factors, in particular the following applies:

$$a_i = e^{-\frac{b \cdot i}{n}}$$

where b is a constant. Further $\chi_n(\bullet)$ denotes an indicator function, for example:

$$\chi_n(x_i x_{i-1}) = \begin{cases} 1, & \text{if } x_i x_{i-1} \ge 0 \\ 0, & \text{if } x_i x_{i-1} < 0 \end{cases}$$

Figure 6:
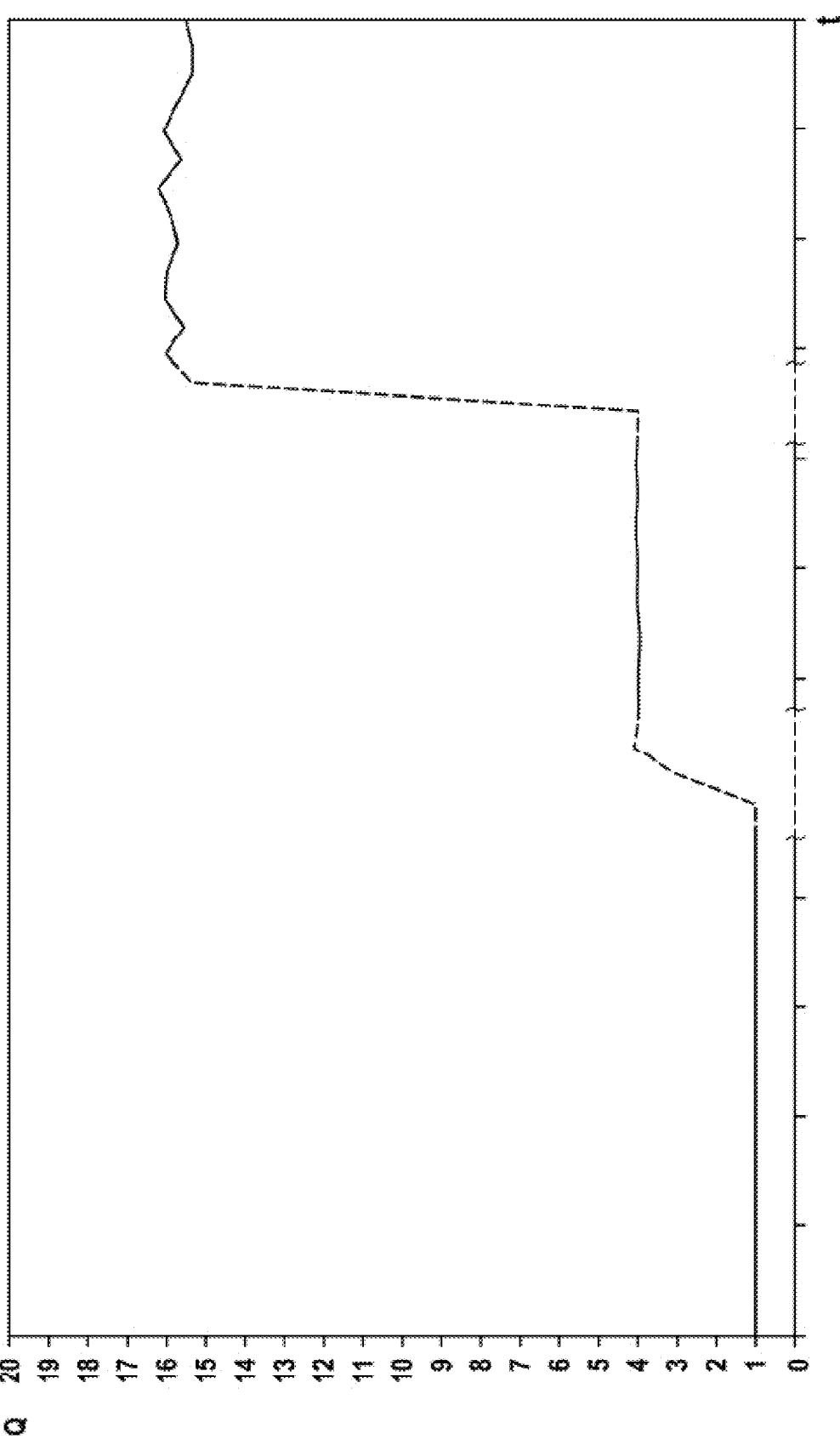
FIG. 6 shows the progression of the state evaluation quantity over different damage levels.

FIG. 6 shows the course of the state evaluation quantity 13 (denoted by Q at the ordinate) over time (denoted by t at

15

Figure 7:
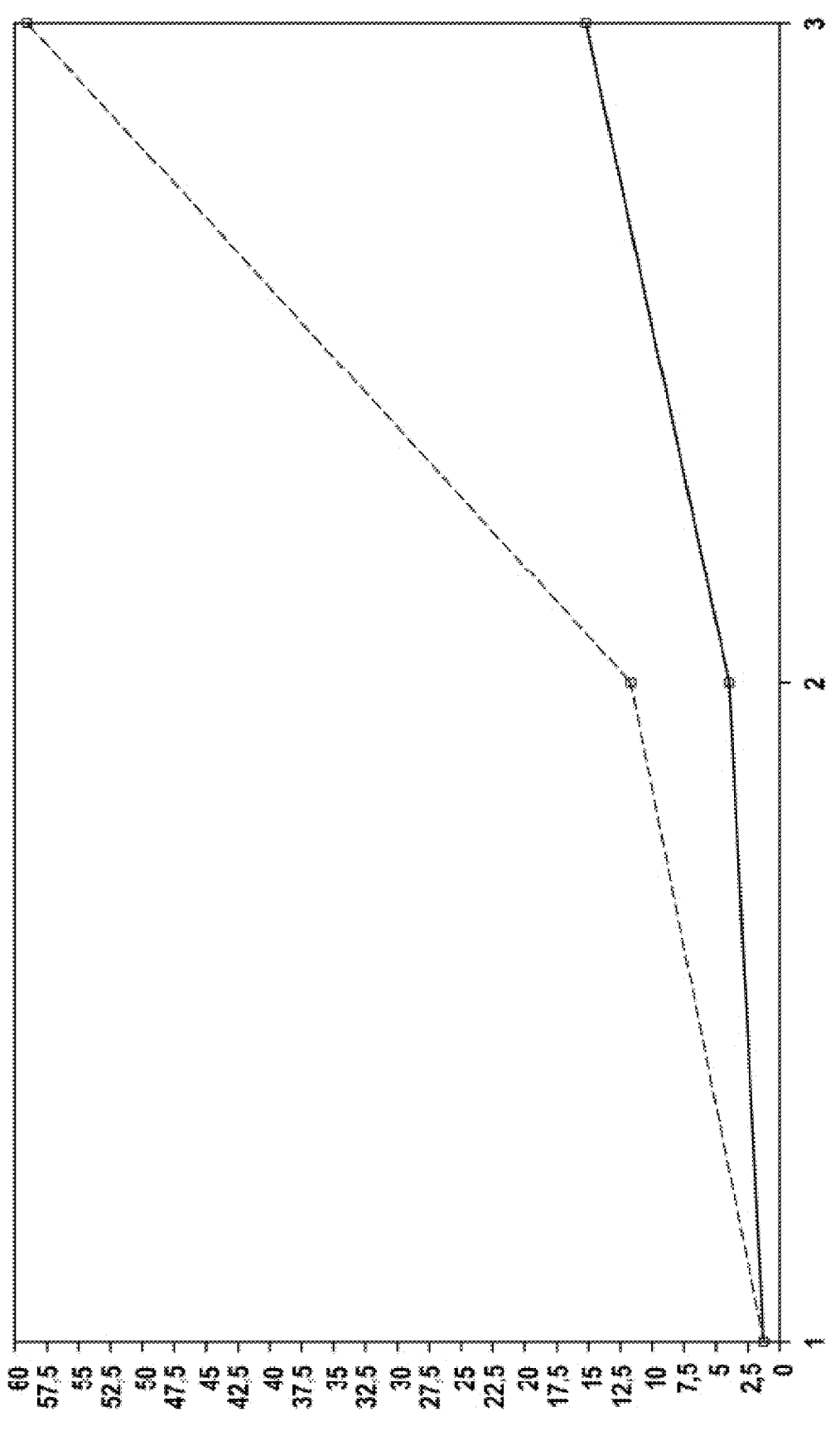
FIG. 7 courses of the state evaluation quantity at different selected spectral sections.

16 the abscissa) for a time shortly after the reference state, for low damage and for advanced damage. FIG. 7 shows purely qualitative progressions of the state evaluation quantity when the spectral sections for which the relative excitation values are determined are chosen differently. For example, the solid line corresponds to a frequency band from 0 to 50 kHz, while the dashed line corresponds to a frequency band from 11 to 18 kHz.

In a step S280, the state evaluation quantity 13 is provided at the or a radio and/or hardware interface 23.

In a step S290, the state evaluation quantity 13 and a time history of the state evaluation quantity 13 are displayed on the display device 23.

Figure 8:
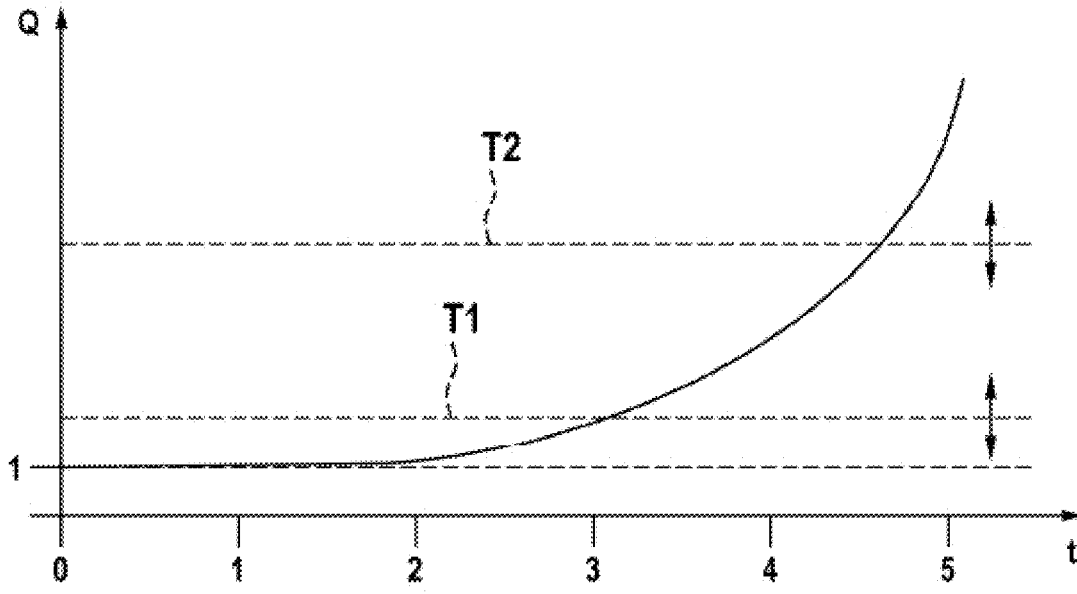
FIG. 8 possible alarm thresholds for the state evaluation quantity.

In a step S300, the state evaluation quantity 13 is compared with two threshold values T1, T2. FIG. 8 shows an exemplary progression of the state evaluation quantity 13 (again denoted by Q on the ordinate) over time (denoted by t on the abscissa).

In a subsequent step S310, a visually and/or acoustically and/or haptically perceptible signal is output by means of the output unit 21 when the threshold value T1 is exceeded or reached. The threshold value T1 represents a warning threshold. If the threshold value T2 is exceeded or reached, a further visually and/or acoustically and/or haptically perceptible signal is output by means of the output unit 21. The threshold value T2 here represents an alarm threshold.

Steps S200 to S300 or S200 to S310 are then repeated at predefined or adjustable intervals, in particular periodically or adjustable time intervals, in particular periodically. Typical repetition rates are, for example, once per hour.

According to a further embodiment, to which all embodiments of the preceding embodiment examples can be applied, the device 1 may further comprise an environment sensor (not shown). The environment sensor provides environment information describing an environment parameter of the object 2. Alternatively or additionally, the device 1 comprises an input (not shown) for obtaining the environmental information, which is obtainable as an analog or digital control signal from a programmable logic controller. The environmental parameter may be a temperature and/or a humidity and/or a displacement and/or a force and/or an elongation and/or a velocity and/or an acceleration and/or an SPS process section and/or a flow and/or a position, in particular an angular or switching position, and/or an illuminance and/or a position and/or an inclination and/or a magnetic field and/or a rotational speed and/or a pressure. Accordingly, the environmental sensor may comprise a temperature sensor and/or a humidity sensor and/or a position sensor and/or an inclination sensor and/or a gyroscope and/or a magnetic field sensor and/or a rotational speed sensor and/or a displacement sensor and/or a force sensor and/or a strain sensor and/or a velocity sensor and/or an acceleration sensor and/or a position sensor and/or a light sensor and/or a flow sensor and/or a pressure sensor. The excitation information is correlated with the environmental information.

Furthermore, the excitation information 4 and/or the spectral excitation values 7 and/or the spectral reference excitation values 9 are corrected on the basis of the environmental information. This is done on the basis of data stored in memory 24 about a dependence of this information or values on the environmental information. The dependence is stored in the form of a function or a formula, so that the relative excitation values 11 are determined as a function of the corrected spectral excitation values 7 and/or the corrected spectral reference excitation values 9.

Exemplarily, the spectral reference excitation values 9 and/or the spectral excitation values 7 are corrected via a stored temperature dependence function using the environmental information describing the temperature before the state evaluation quantity 13 is calculated. Thus, a temperature correction of the state evaluation quantity 13 can be achieved. Correspondingly, also in the case of a speed dependence, for example, a correction of the spectral excitation values 7 and/or the spectral reference excitation values 9 can be corrected with the aid of the environmental information describing the speed, before the state evaluation quantity 13 is determined. In this way, a speed correction of the state evaluation quantity can be achieved.

It is also possible that the state evaluation quantity 13 is corrected based on the environmental information as an alternative or in addition to correcting the spectral excitation values 7 and/or the reference excitation values. This can be done by means of the user interface 20.

According to further embodiments, to which all embodiments of the preceding embodiments can be applied, the repetition is triggered by a trigger signal. In this case, the device 1 may have an input and/or an interface (not shown) for an external trigger signal. Alternatively or additionally, the environmental information is used as trigger signal. Alternatively or additionally, the spectral excitation values are generated each time the object is repeated in the same stationary or quasi-stationary operating state, for example at a constant rotational speed. Alternatively, the spectral excitation values are generated during the repetition at several different steady-state or quasi-steady-state operating states of the object. Through the quasi-stationary operating states, a non-stationary operating state, which is e.g. also composed of a sequence of different quasi-stationary operating states, can be detected in order to be evaluated or characterized. In particular, for non-stationary states with a characteristic course, an evaluation of the change of its characteristic can additionally be performed. The stationary or quasi-stationary operating state corresponds in particular to that at which the reference excitation values were generated. In this case, the time window can be between a tenth of a second and 10 seconds.

According to further embodiments, to which all embodiments of the preceding embodiments can be applied, a sensing area of the sensor(s) 16 exhibits resonance at a predetermined frequency or frequencies. The sensor 16 is tuned with respect to the predetermined frequency or frequencies to a frequency at which a change in the state of the object 2 is expected.

Although the method was previously discussed in terms of the degree of wear of a bearing as an object, the state can also be a lack of lubrication, contamination, fatigue, defect, operating state, intactness, health state, quality, utilization, power input, level, hardness, or fluid delivery quantity. A variety of use cases are also conceivable with respect to the object 2: For example, the object may be a machine, a plant, a machine element, in particular a gear, a bearing, a pump, a motor or a robot, a manufacturing tool, a land, water, air or space vehicle or a part thereof, a structure, a component or a building or a part thereof. It is also possible that the object 2 is a body part of a living being, in particular an animal or a human being.

According to further embodiments, the operating state may be a stationary operating state or a non-stationary operating state, in particular with an arbitrary or characteristic course. The machine may be an injection molding machine. The bearing may be a slewing bearing, for example in a crane or a wind turbine. In a wind turbine, the pivot bearing may be a pitch bearing. The object may further be an actuator or a retraction and extension mechanism, in particular of a solar sail of a satellite, a landing gear of an aircraft or a soft actuator.

The invention claimed is:

1. A method for evaluating a state of an object (2), comprising the following steps:

obtaining excitation information (4) describing mechanical excitation of the object (2);

generation of a plurality of spectral excitation values (7) as a function of the excitation information (4) by means of a frequency analysis, the spectral excitation values (7) each being assigned to one spectral section of a plurality of predetermined spectral sections;

obtaining a plurality of spectral reference excitation values (9) relating to a reference state of the object (2) and associated with a respective one of the spectral portions;

determining relative excitation values (11) for at least a part of the spectral sections by relating the spectral excitation value (7) associated with the respective spectral section to the spectral reference excitation value (9) associated with the respective spectral section; and determining a state evaluation quantity (13) by a state evaluation function, which links the relative excitation values (11) or values derived from the relative excitation values as parameters and includes:

(i) a summation, the formation of an arithmetic mean, the formation of an effective value or the formation of a zero crossing rate; or (ii) a weighting of the parameters.

2. The method according to claim 1, wherein the spectral excitation values (7) and the spectral reference excitation values (9) describe an amplitude, a phase, a power, or a power spectral density.

3. The method according to claim 1, wherein the spectral excitation values (7) or the reference excitation values describe:

an effective value, an amount maximum value or an amplitude distribution density or a value derived therefrom, including a crest factor or a kurtosis factor.

4. The method according to claim 1, wherein the frequency analysis has a frequency resolution of at least 1 Hertz, further preferably at least 10 Hertz, further preferably at least 100 Hertz, particularly preferably at least 1 kHz.

5. The method according to claim 1, wherein as respective parameter a parameter value determined from an inverted relative excitation value (11) is used when the spectral excitation value (7) is smaller than the spectral reference excitation value (9), and the relative excitation value (11) is used when the spectral excitation value (7) is larger than the spectral reference excitation value (9), or a parameter value determined from an inverted relative excitation value (11) is used when the spectral excitation value (7) is greater than the spectral reference excitation value (9), and the relative excitation value (11) is used when the spectral excitation value (7) is less than the spectral reference excitation value (9).

6. The method according to claim 1, wherein weighting of the parameters is performed (i) by means of rational, real or complex weighting factors with an irrational component; or (ii) by means of linear or exponential weighting factors; or (iii) frequency dependent weighting factors.

7. The method according to claim 1, further comprising the following step: displaying the state evaluation quantity (13) or a time history of the state evaluation quantity (13) on a display unit (23); or the following step: providing the state evaluation quantity (13) at a radio or hardware interface (22); or the following steps: performing a comparison of the state evaluation quantity (13) or a change over time of the state evaluation quantity (13) with one or more predetermined or adjustable threshold values (T1, T2); and outputting an acoustically or visually or haptically perceptible signal as a function of a result of the comparison.

8. The method according to claim 1, further comprising the following step:

providing the spectral excitation values (7) or the relative excitation values (11) at a radio or hardware interface (22).

9. The method according to claim 1, further comprising the following step:

detecting the mechanical excitation and providing the excitation information.

10. The method according to claim 9, wherein the detection is carried out by means of at least one sensor, including a vibration sensor or a sound sensor or a structure-borne sound sensor or an acceleration sensor or an optical sensor.

11. The method according to claim 10, wherein a detection area of the at least one sensor resonates at a predetermined frequency or frequencies.

12. The method according to claim 11, wherein the at least one sensor is or is tunable with respect to the predetermined frequency or frequencies, including a frequency at which a change in the state of the object is to be expected.

13. The method according to claim 1, further comprising the following steps preceding the step of obtaining the excitation information (4):

determining the spectral reference excitation values (9) corresponding to the spectral excitation values (7) when the object (2) is in the reference state prior to the step of detecting the mechanical quantity; and storing the determined spectral reference excitation values (9).

14. The method according to claim 1, wherein at least the generation of the spectral excitation values (7), including the determination of the relative excitation values (11) or the determination of the state evaluation quantity (13), is carried out repeatedly.

15. The method according to claim 14, wherein the repetition is time-controlled or triggered by a trigger signal, including an external trigger signal.

16. The method according to claim 14, wherein the spectral excitation values are generated in the course of the repetition at several different stationary operating states or quasi-stationary operating states, by which a non-stationary operating state of the object (2), composed of those states, is detected.

17. The method according to claim 14, wherein the spectral reference excitation values (9) for each repetition refer to a different reference state.

18. The method according to claim 1, wherein environment information describing at least one environment parameter of the object (2) is used.

19. The method according to claim 18, wherein the environment information
   is provided by an environmental sensor; or
   is received as a control signal, including analog or digital.

20. The method according to claim 18, wherein, at least the generation of the spectral excitation values (7), including the determination of the relative excitation values (11) or the determination of the state evaluation quantity (13), is carried out repeatedly;
   the repetition is time-controlled or triggered by a trigger signal, including an external trigger signal; and
   the environmental information is used as trigger signal.

21. The method according to claim 18, wherein
   the excitation information (4) or the state evaluation quantity (13) is correlated with the environmental information or
   the excitation information (4) or the spectral excitation values (7) or the spectral reference excitation values (9) are corrected on the basis of the environmental information or
   the state evaluation quantity (13) is corrected based on the environmental information.

22. A device (1) for evaluating a state of an object (2), including set up for carrying out a method according to claim 1, comprising:
   a data interface (3) arranged to obtain excitation information (4) describing a mechanical excitation of the object (2); and
   a signal analysis unit (5) comprising
   an analysis section (6) arranged to generate a plurality of spectral excitation values (7) in dependence on the excitation information (4) by means of a frequency analysis, the spectral excitation values (7) each being associated with one spectral section of a plurality of predetermined spectral sections,
   a data interface (8) arranged to obtain a plurality of spectral reference excitation values (9) relating to a reference state of the object (2) and associated with a respective one of the spectral sections,
   a first determination section (10) arranged to determine relative excitation values (11) for at least a part of the spectral sections by relating the spectral excitation value (7) associated with the respective spectral section to the spectral reference excitation value (9) associated with the respective spectral section; and
   a second determination section (12) arranged to determine a state evaluation quantity (13) by a state evaluation function using the relative excitation values (11) or parameter values derived therefrom as parameters, wherein the state evaluation function includes:
      (i) a summation, the formation of an arithmetic mean, the formation of an effective value or the formation of a zero crossing rate; or
      (ii) a weighting of the parameters.

23. The device according to claim 22, further comprising:
   a radio or hardware interface (22) adapted to provide the spectral excitation values (7) or the relative excitation values (11) or the state evaluation quantity (13); or a display unit (23) arranged to display the state evaluation quantity (12) or a time history of the state evaluation quantity (12); or
comparison unit (19) which is set up to carry out a comparison of the state evaluation quantity (13) or a change over time of the state evaluation quantity (13) with one or more predefined or adjustable threshold values (T1, T2); and an output unit (21) which is set up to output an acoustically or visually or haptically perceptible signal as a function of a result of the comparison.

24. The device according to claim 22, further comprising:
a detection unit (14), which is set up to detect analog measurement signals (15) of the mechanical excitation and to provide the excitation information (4) for the data interface (3), wherein the detection unit (14) for detecting the analog measurement signals (15) comprises a vibration sensor or a sound sensor or a structure-borne sound sensor or an acceleration sensor or an optical sensor.

25. The device according to claim 24, wherein the detection unit (14)
   is arranged to convert the analog measurement signals (15) into digital measurement signals, or
   further comprises a signal processing section (25) which is set up for filtering or for, adjustable, analog signal conditioning of the analog measurement signals, the detection unit (14) being set up for converting the filtered or conditioned measurement signals (15a) into digital measurement signals, the acquisition unit being set up for providing the digital measurement signals as excitation information (4) at the data interface (3).

26. The device according to claim 22, wherein the analysis section (6) is furthermore
   set up to provide output data of the frequency analysis as spectral excitation values (7) or
   comprises a signal processing subsection (26) which is set up, on the one hand, for filtering or for, adjustable, digital signal conditioning of the output data of the frequency analysis and, on the other hand, for providing the filtered or conditioned output data (7a) of the frequency analysis as spectral excitation values (7).

27. The device according to claim 22, further comprising, an input or an interface for an external trigger signal.

28. The device according to claim 22, further comprising, an environment sensor, which is arranged to provide environment information describing an environment parameter of the object or
an interface through which the environment information can be obtained.

29. The device according to claim 22, wherein weighting of the parameters is performed
   (i) by means of rational, real or complex weighting factors with an irrational component; or
   (ii) by means of linear or exponential weighting factors; or
   (iii) frequency dependent weighting factors.

* * * * *